US011438252B2

(12) United States Patent
Malysh et al.

(10) Patent No.: US 11,438,252 B2
(45) Date of Patent: Sep. 6, 2022

(54) PACKET DROP DETECTION IN LOCAL NETWORKING STACK THROUGH PACKET CORRELATION

(71) Applicant: Microsoft Technology Licensing, LLC, Redmond, WA (US)

(72) Inventors: Alexander Malysh, Bothell, WA (US); Thomas Edward Molenhouse, Bellevue, WA (US); Omar Cardona, Bellevue, WA (US); Kamran Reypour, Kirkland, WA (US); Gregory Cusanza, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/427,387

(22) Filed: May 31, 2019

(65) Prior Publication Data

US 2020/0322242 A1 Oct. 8, 2020

Related U.S. Application Data

(60) Provisional application No. 62/829,314, filed on Apr. 4, 2019.

(51) Int. Cl.
*H04L 12/26* (2006.01)
*H04L 29/06* (2006.01)
(Continued)

(52) U.S. Cl.
CPC .......... *H04L 43/0829* (2013.01); *H04L 41/22* (2013.01); *H04L 43/028* (2013.01); *H04L 69/18* (2013.01)

(58) Field of Classification Search
CPC ... H04L 43/0829; H04L 41/22; H04L 43/028; H04L 69/18
See application file for complete search history.

(56) References Cited

U.S. PATENT DOCUMENTS

2013/0067067 A1\* 3/2013 Miri .................... G06F 9/45533
709/224
2014/0160941 A1\* 6/2014 Hui ....................... H04W 24/10
370/241
(Continued)

OTHER PUBLICATIONS

Wireshark (Wireshark User's Guide, Published on Oct. 20, 2018, https://web.archive.org/web/20181020203017/https://www.wireshark.org/docs/wsug_html_chunked/index.html, retrieved on Dec. 1, 2020). (Year: 2018).\*

(Continued)

*Primary Examiner* — Abdulkader M Alriyashi
(74) *Attorney, Agent, or Firm* — Mark K. Young; Mayer & Williams, PC

(57) ABSTRACT

A packet monitoring application instantiated on a server hosting a virtualized network stack is utilized to track data packet propagations and drops at each component within the network stack to reduce the amount of time to identify a root cause for latency issues. The packet monitoring application can be selectively enabled or disabled by an administrator. Components within the virtualized network stack report packet drops and successful packet propagations to the packet monitoring application, which can filter the packets based on input parameters. Thus, a user can select at what level of granularity to filter packets within the virtualized network stack while being able to assess each packet's traversal through each component within the network stack. The packet monitoring application can also perform post-processing of on the filtered data packets to determine latency among components or sections of the virtualized network stack.

19 Claims, 13 Drawing Sheets

(51) Int. Cl.
*H04L 12/24* (2006.01)
*H04L 43/0829* (2022.01)
*H04L 41/22* (2022.01)
*H04L 69/18* (2022.01)
*H04L 43/028* (2022.01)

(56) References Cited

U.S. PATENT DOCUMENTS

| | | |
|---|---|---|
| 2014/0281030 A1 | 9/2014 | Cui et al. |
| 2016/0142280 A1* | 5/2016 | Krishnamoorthy ..... H04L 43/50 703/20 |
| 2017/0093677 A1 | 3/2017 | Skerry et al. |
| 2019/0104048 A1* | 4/2019 | Nainar ................. H04L 45/021 |
| 2020/0213214 A1* | 7/2020 | Huang ................... H04L 43/10 |

OTHER PUBLICATIONS

"International Search Report and Written Opinion issued in PCT Application No. PCT/US20/024527", dated Jul. 1, 2020, 10 Pages.

\* cited by examiner

200

1400

PACKET DROP DETECTION IN LOCAL NETWORKING STACK THROUGH PACKET CORRELATION

CROSS-REFERENCE TO RELATED APPLICATIONS

This non-provisional patent application claims benefit and priority to U.S. Provisional Ser. No. 62/829,314 filed Apr. 4, 2019, entitled Packet Drop Detection in Local Networking Stack through Packet Correlation," the disclosure of which is incorporated herein by reference in its entirety.

BACKGROUND

A datacenter can be set up with virtual machines or containers that run applications and software which are provided to customers for utilization. A virtualized network stack operating within respective computer servers of the datacenter can have a number of components for receiving and delivering data packets. The components within the virtualized network stack each serve a unique function that can be a point of failure (e.g., packet drops or increased latency) for data reception and transmission. In some scenarios, issues realized by customers when accessing their virtual machine or container may be difficult to identify where the root cause is for the latency occurring within the virtual network stack.

SUMMARY

A packet monitoring application instantiated on a server hosting a virtualized network stack is utilized to track data packet propagations and drops at each component within the network stack to reduce the amount of time to identify a root cause for latency issues. The packet monitoring application can be selectively enabled or disabled by a computer server administrator. When disabled, the components within the virtualized network stack do not report packet propagations or drops to the packet monitoring application. When enabled, the components call the application programming interface (API) associated with the packet monitoring application and report packet drops and propagations to the packet monitoring application. A user can input parameters into the packet monitoring application by which certain packets are selected for exposure to the user and other packets are ignored or disregarded. Filtration parameters can include a customized level of granularity in the virtualized network stack components, including a monitoring level within the components (e.g., miniports or specific components within the virtualized network stack), and communication protocol (e.g., Transmission Control Protocol (TCP), User Datagram Protocol (UDP), etc.), among other parameters. Unique correlation identifiers (IDs) are associated with each data packet to enable tracking of packets across each component in the network stack. The ability to identify packet propagation and drops at each component within the network stack enables a user to identify where packet drops or latency occurs within the network stack, and thereby reduce the time to identify a root cause. Post-processing of the filtered data packets can also be implemented in which various determinations or calculations are performed on the data packets, such as packet latency at the entire or a portion of the network stack, packet propagation averages through components in the network stack, etc.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DETAILED DESCRIPTION

Figure 1:
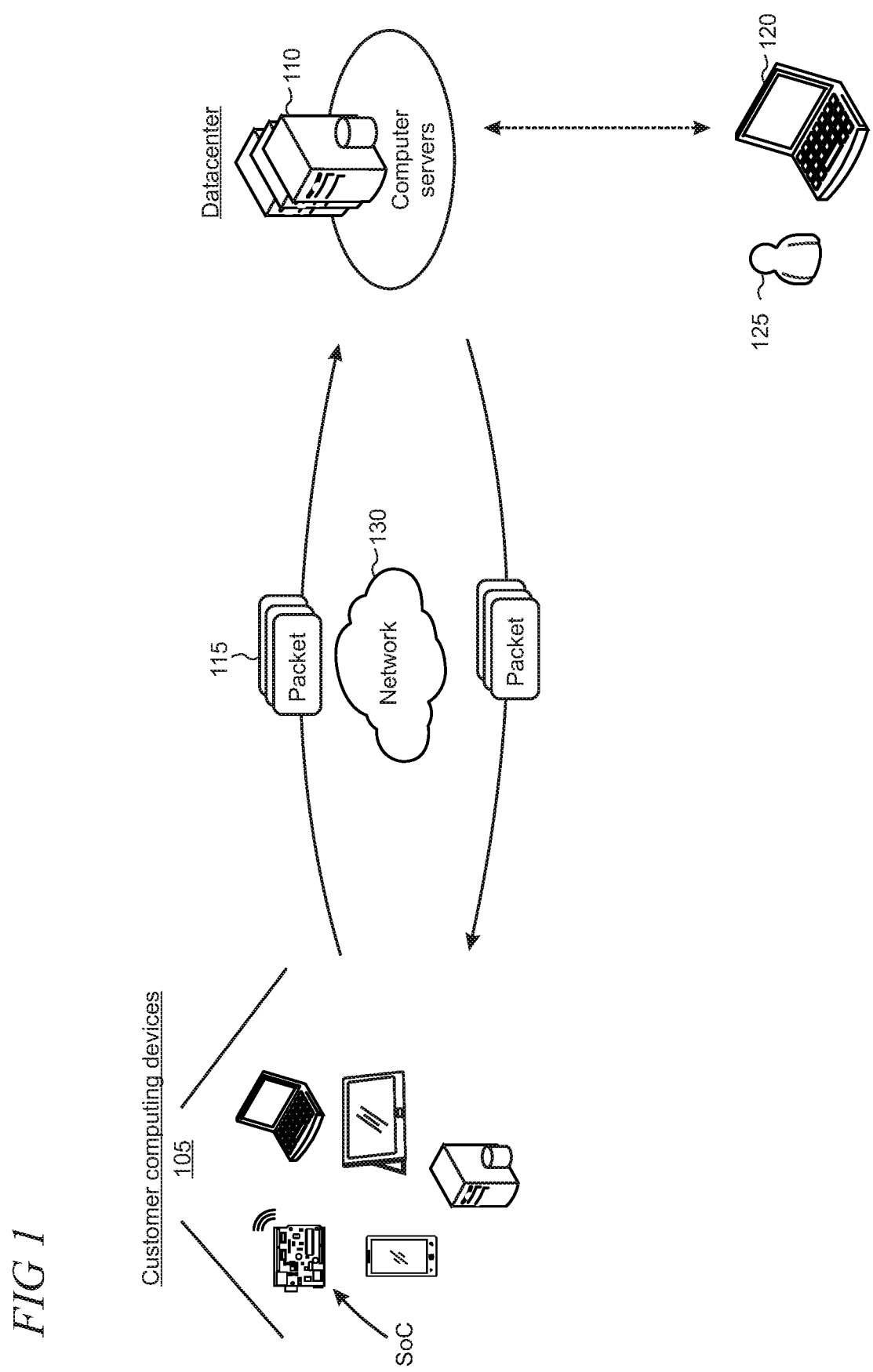
FIG. 1 shows an illustrative environment in which remote computing devices communicate packets with computer severs operating in a datacenter.

FIG. 1 shows an illustrative environment in which customer computing devices 105 communicate data packets 115 over network 130 with computer servers 110 that may be operating in a datacenter. The network may include a local area network, wide area network, and the internet. A computing device 120 local to the computer servers may be configured with a user interface to enable a user 125 to control aspects and operations over the computer servers. The computer servers in the datacenter may be associated with a cloud service provider that provides solutions to customers operating the customer computing devices. The computer servers may, for example, host virtual machines or containers which are each associated with and accessible by a unique customer. The virtual machines and containers may provide solutions to the customer computing devices such as data analytics, data storage, artificial intelligence processes, etc. A single computer server can host many virtual machines and/or containers which are respectively accessible by multiple different customers.

The customer computing devices 105 can be any number of devices which are configured with network connectivity to connect with and leverage the solutions offered by the computer servers 110. Non-exhaustive types of computing devices include a laptop computer, smartphone, tablet computer, a local server, and Internet of Things (IoT) devices which can collect and report telemetry data (as generically and illustratively shown by the System on a Chip (SoC) device). Multiple data packets 115 can be transmitted between the computer servers and the customer computing devices.

Figure 2:
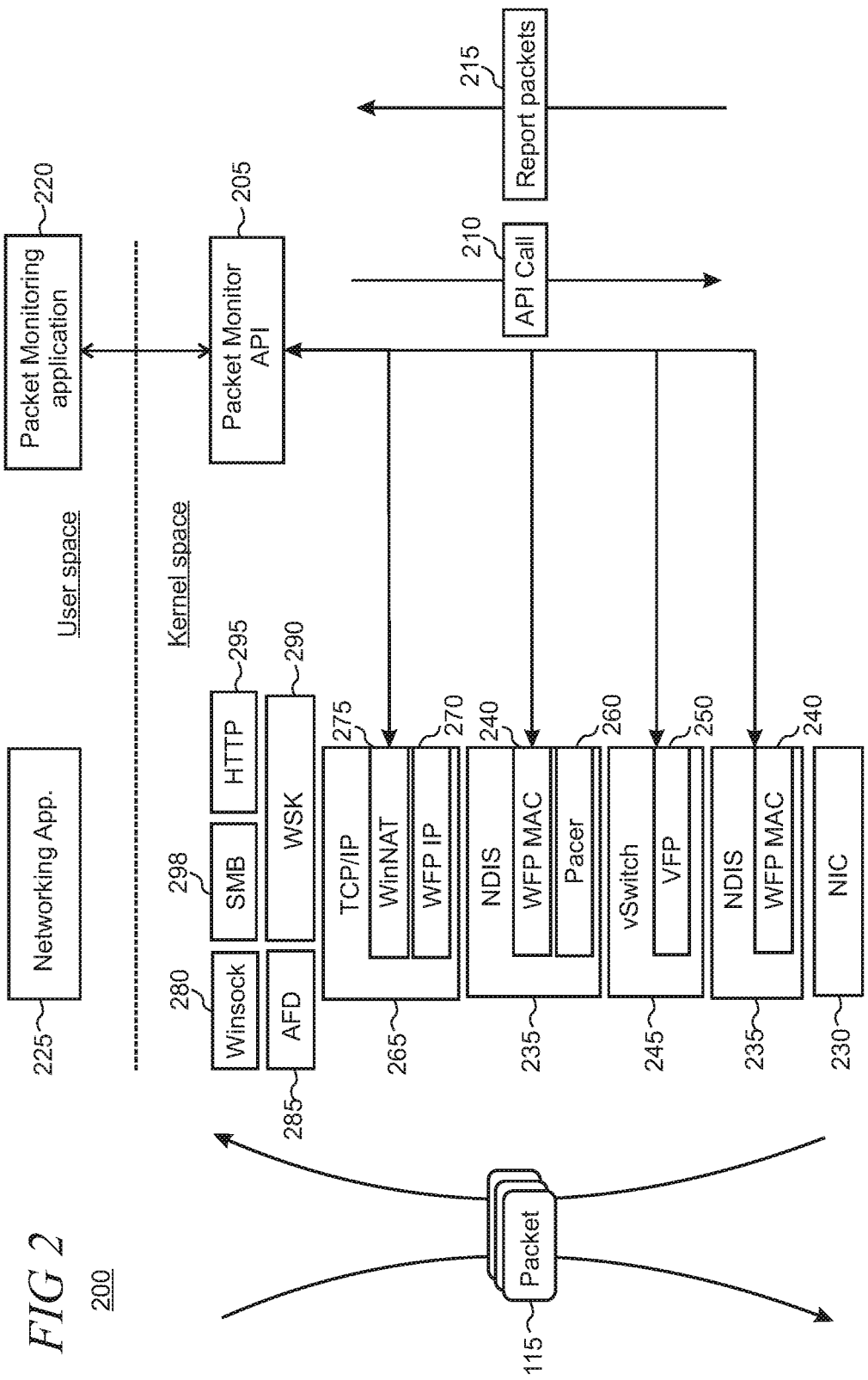
FIG. 2 shows an illustrative diagram of components within a virtualized network stack.

FIG. 2 shows an illustrative diagram of a virtualized networking stack 200 configuration for a host computer server. Each component within the networking stack may communicate with a packet monitor application programming interface (API) 205. For example, each stack component may perform an API call 210 and report packets 215 to the packet monitoring application 220, such as a status of a packet (e.g., packet drops and successful packet propagations). The packets 115 may go in either direction, that is, delivery or reception, within the network stack. The virtualized network stack may be utilized to deliver packets to a respective customer's virtual machine or container. Thus, multiple virtual machines and containers operated by multiple different customers can operate within a datacenter and be processed together by a single computer server or multiple computer servers.

A brief description of the components within the virtualized network stack 200 follows. While some of the monikers utilized throughout the description and drawings may be specific to the Windows® platform, the described functionality may be applicable to any implementation. In other implementations of the virtualized network stack, for example, some of the components depicted may not be employed or additional components may be employed.

The networking application 225 may be utilized to provide to a user control over the components. The packet monitoring application 220 is exposed to the user on a user interface associated with the computer server for enabling or disabling invocation of the packet monitor API 205 by the components within the network stack.

The network interface controller (NIC) 230 may be the hardware device implemented to enable Wi-Fi, ethernet, or other connections. The NIC 230 may provide the physical and data link layer network communications to another device, such as a router. The NDIS (Network Driver Interface Specification) 235 provides an API for the NIC which includes a library of functions which serves as a standard interface. The WFP (Windows® Filtering Platform) (i.e., WFP MAC 240) is a set of system services and an API that provides a platform for creating network filtering applications. The WFP allows developers to write code that interacts with the packet processing that takes place at several layers in the networking stack of the operating system. For example, developers can implement firewalls, intrusion detection systems, antivirus programs, network monitoring tools, and parental controls, etc., all before the data reaches its destination. In this example, the WFP filtering may apply at the MAC address level or the IP address level (see WFP IP 270).

The virtual filtering platform (VFP) 250 is an extension for a virtual switch (vSwitch) 245 for the virtual network stack which enables core software defined networking (SDN) functionality for networking services. The VFP may be a programmable network component that exposes an easy-to-program abstract interface to network agents that act on behalf of network controllers like a virtual network controller and software load balancer controller. By leveraging host components and performing packet processing on a host computer server running in the datacenter, the SDN data plane increases scalability for delivery and reception of data.

Pacer 260 is an abbreviated term for Packet Scheduler which is a filter intermediate driver that is provided and enforces quality of service (QoS) parameters for network data flows. The pacer may perform a variety of functions to ensure QoS, including allowing an administrator to prioritize network traffic and limit bandwidth utilization so that the operating system continues to perform certain operations, among other functions.

The TCP/IP (Transmission Control Protocol/Internet Protocol) 265 is the communication protocol utilized at a transport layer and network layers of the TCP/IP stack. These layers establish a reliable connection between a host and client device (e.g., the computer server and the customer computing devices) and route packets between networks. The WinNAT (Windows® Network Address Translation) 275 is utilized to translate private IP addresses assigned to a virtual service (e.g., virtual machine, container, or other service) operating on the computer server and share the public IP address which is routable to the internet. The WFP IP 270 is utilized as described above with respect to WFP MAC 240.

Winsock 280 is an API that handles input/output requests for internet applications within an operating system. Winsock may operate between an application (e.g., a web browser) and the TCP/IP layer, and provides an interface for different versions of operating systems. The AFD (Ancillary Function Driver) 285 is a kernel driver that may be utilized with Winsock to enable the computer server to communicate with hardware or connected devices. WSK (Winsock Kernel) 290 is a kernel-mode network programming interface (NPI) which creates a network interface between network modules that can be attached to one another. For example, client modules registered as a client to a particular NPI can be attached to provider modules that are registered as providers of the same NPI.

HTTP (HyperText Transfer Protocol) 295 and SMB (Sever Message Block) 298 protocol are exemplary communication protocols that operate at the application layer of the TCP/IP model. HTTP utilizes requests and responses to communicate between a client and a server. SMB is a protocol that allows systems operating within the same network to share files. Other application layer protocols not shown can also be implemented, including SMTP (Simple Mail Transfer Protocol), and FTP (File Transfer Protocol).

Figure 3:
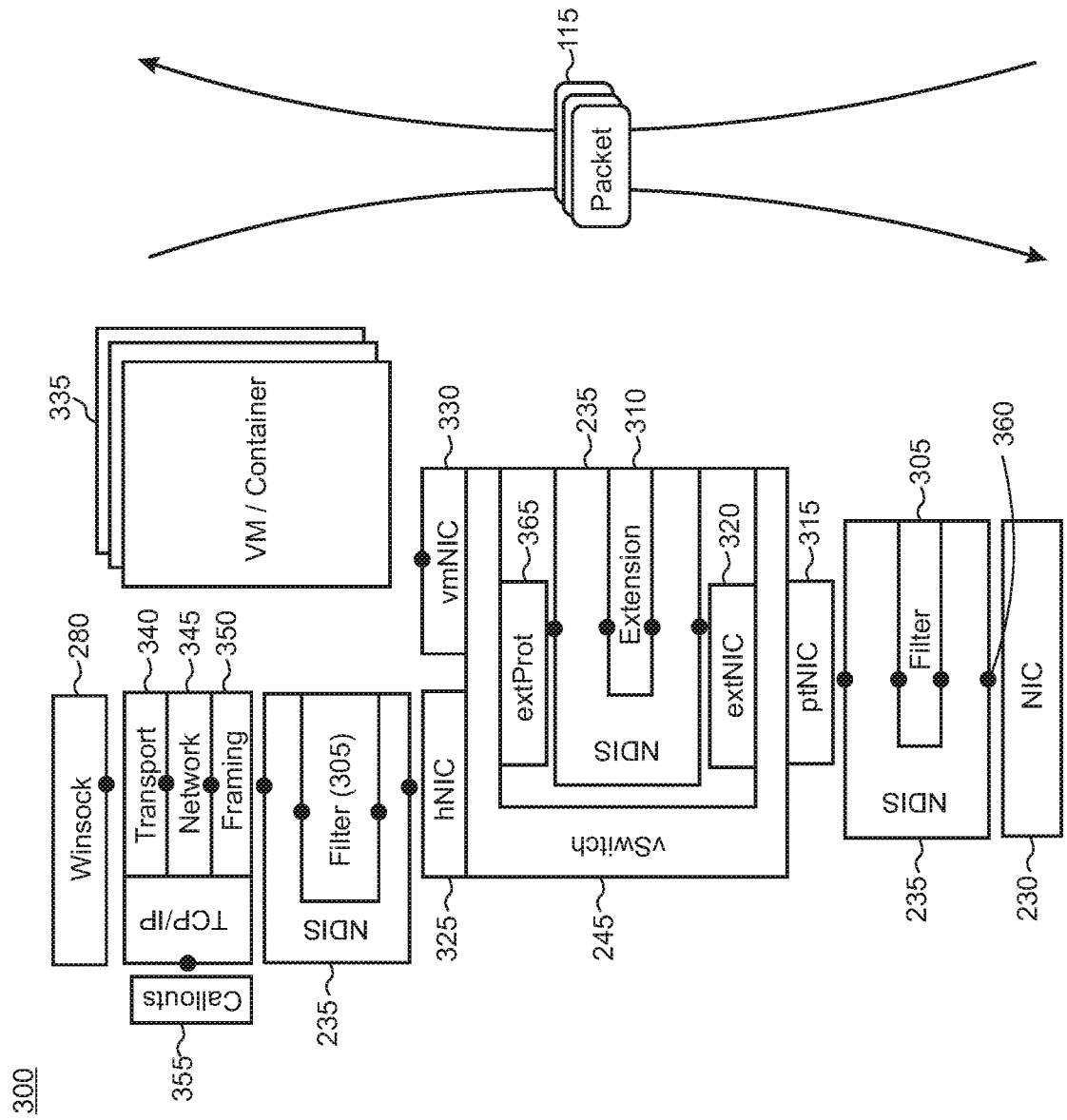
FIG. 3 shows an illustrative diagram of components within a virtualized network stack.

The descriptions provided above with respect to FIG. 2 are applicable to the virtualized network stack depicted in FIG. 3. For example, FIG. 3 depicts generic terms and functions within each network stack 300. The propagation points 360 depict where packets transfer from one component to the next.

The filters 305 and extension 310 associated with the NDIS 235 may, for example, implement the functionality described above with respect to the WFP and VFP and perform filtering functions for the packets. The port NIC (ptNIC) 315 may be a port into or out of the vSwitch 245 and the extension NIC (extNIC) 320 may be the interface to the extension 310 associated with the NDIS 235. The ptNIC may provide an external virtual port for connectivity to the external physical network and can provide a connection to physical functions or virtual functions. The extension protocol (extProt) 365 may be utilized to forward the packets to the next layer within the virtualized network stack, such as the host NIC (hNIC) 325 or virtual machine NIC (vmNIC) 330. The vmNIC can transfer packets to or from the virtual machines or containers 335 and can be utilized to connect the virtual machine to the internet or to bridges to different network segments.

The hNIC 325 may be utilized to transfer packets to or from operations or applications on the computer server distinct from the virtual machines or containers. When a packet goes through the hNIC, the NDIS 235 and filters 305 are applied to the packets before forwarding the packet to the TCP/IP stack, which illustratively shows the transport 340, network 345, and framing 350 layers. The callouts 355 may be a set of functions exposed by a driver that is used for specialized filtering and manipulation of packets, such as virus scan, parental controls for inappropriate content, and packet data parsing, among other functions.

The virtual machine/containers 335 serve different functions and can be configured differently by customers. A virtual machine is an emulation of a computer system that is instantiated on a host computer server, in which multiple virtual machines running in isolation can be employed. Virtual machines include their own virtual hardware, including processing units, memory, network interfaces, etc. Virtual machines can run different guest operating systems and applications depending on the customer's configuration. Containers likewise can perform processes for customers but may not utilize a guest operating system as with the virtual machine, rather, containers consist of the application code to perform a function. Containers may be isolated to the application code and what is necessary to perform the container's intended function.

Figure 4:
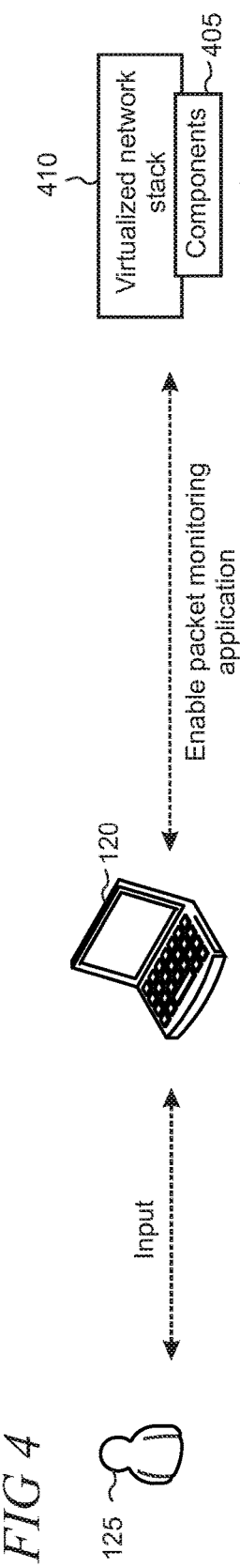
FIG. 4 shows an illustrative environment in which user input enables a packet monitoring application.

FIG. 4 shows an illustrative environment in which the user 125 enters input into the computing device 120 to enable the packet monitoring application. Upon enabling the packet monitoring application, the components 405 within the virtualized network stack 410 call the packet monitor API 205. The virtualized network stack 410 is used to represent, for example, the network stacks depicted in FIG. 2 or 3. Likewise, components 405 are used to represent any one or more of the network components, physical or virtual, of the network stacks depicted in FIG. 2 or FIG. 3. Thus, references to the components can reference any one or more of the network components that make up the virtualized network stack, including the NDIS, vSwitch, NIC, TCP/IP, vmNIC, filters, extensions, etc.

Figure 5:
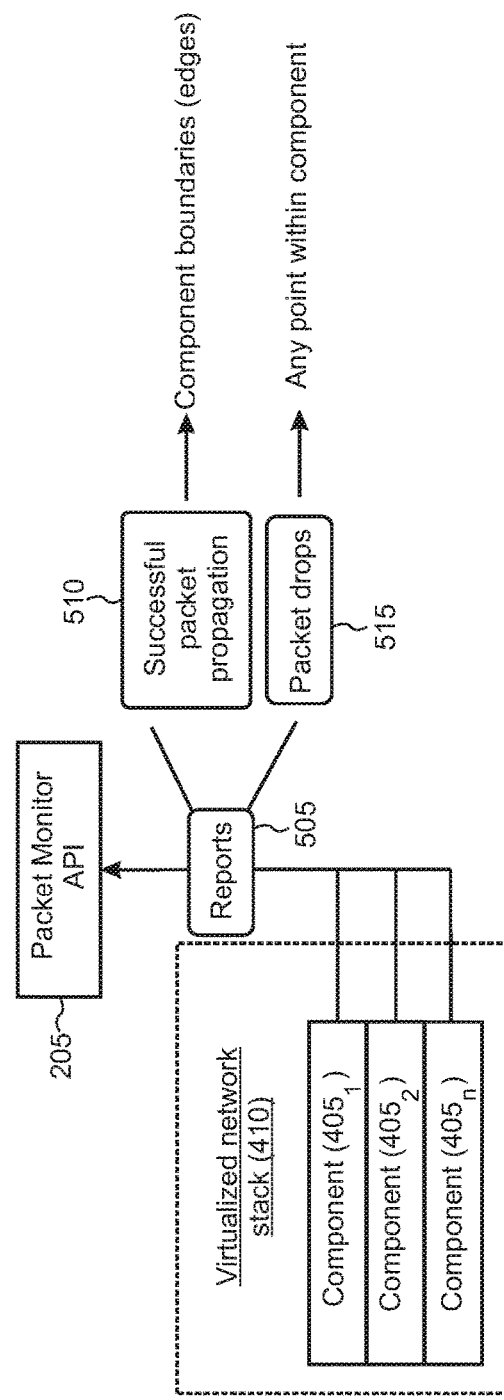
FIG. 5 shows an illustrative diagram in which the components within the network stack transmit reports for packet propagation and packet drops to the packet monitor application programming interface (API)

FIG. 5 shows an illustrative diagram in which registered components 405 transmit reports 505 to the packet monitor API 205. The reports include packet information for successful packet propagation 510 and packet drops 515 at the components. Successful packet propagation may be assessed and reported based on the boundaries (or edges) of the components, such as where the packets enter and leave the component (see, for example, propagation points 360 in FIG. 3). Packet drops may be assessed and reported at any point within the component so that the packet monitor API has the information as to where the packet drop occurred intra-component. This information can be useful in determining whether specific functions within a component are interfering with packet propagation.

Figures 6, 7:
FIG. 6 shows an illustrative environment in which a computing device receives filtration parameters from user input.
FIG. 7 shows an illustrative taxonomy of parameters by which data packets are tracked and filtered in the virtualized network stack.

FIG. 6 shows an illustrative environment in which the user 125 uses the computing device 120 to input packet filtration parameters used by the packet monitoring application 220. The parameters are used by the packet monitoring application in assessing which packet information to select for display on the user interface on the computing device 120 and which packet information to ignore or disregard. Depending on the scenario, certain packets may be more probative and related to a latency issue experienced by a customer than other types of packets. Connectivity issues experienced by a customer may indicate to an administrator of the computer server on which the virtualized network stack is located that HyperText Transfer Protocol (HTTP) packets are pertinent to identify where the latency or packet drops are occurring on the network stack. Server Message Block (SMB) or other protocols may be irrelevant to the user's browser connectivity issues, and therefore are filtered out and not presented to the user by the packet monitoring application 220.

FIG. 7 shows an illustrative taxonomy of parameters 705 by which the packet monitoring application filters received packets within the virtualized network stack. The non-exhaustive parameters include monitoring level (e.g., miniports only, specific component, all components, etc.) 710, media access control (MAC) source and/or destination 715, ethernet protocol (e.g., any, IPv4 (Internet Protocol version 4), IPv6, ICMP (Internet Control Message Protocol), ICMPv6) 720, VLAN (Virtual Local Area Network) ID 725, IP address source or destination (e.g., any, one address, or two addresses) 730, communication protocol (e.g., any, TCP (Transmission Control Protocol), UDP (User Datagram Protocol)) 735, TCP flags (e.g., TCP SYN (synchronize), TCP RST (reset), or TCP FIN (finish)) 740, port source and/or destination (e.g., any, one port, or two ports) 745, packet encapsulation (examine inner and/or outer packets) 750, and the type of traffic (e.g., storage, web-based, artificial intelligence, etc.) 755. Any one or more of these parameters can be input and configured into the packet monitoring application to filter and track particular packet configurations that are informative to a packet loss or latency issue experienced by a customer.

Figure 8:
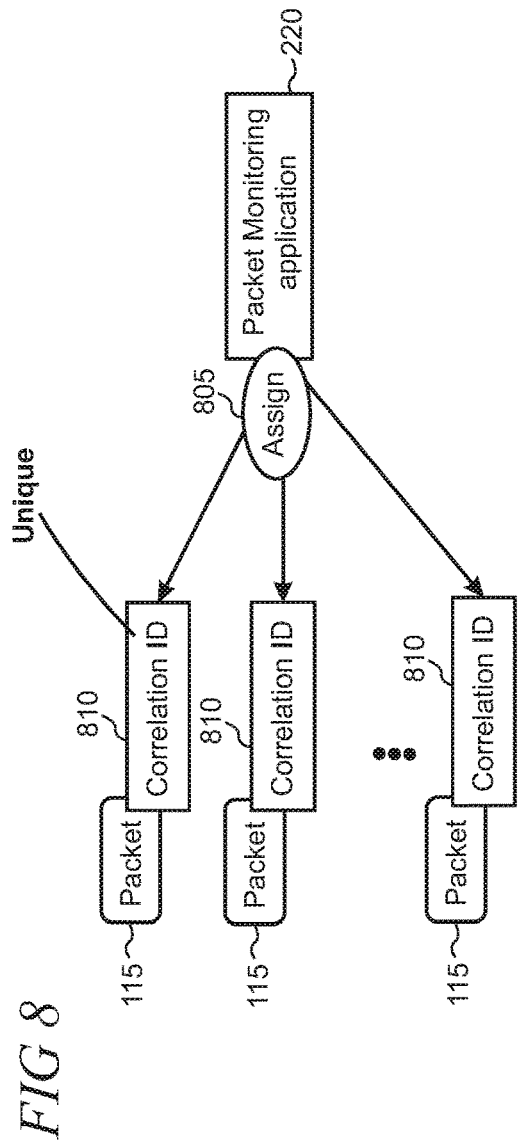
FIG. 8 shows an illustrative diagram in which data packets are assigned a unique correlation identifier (ID) by the packet monitoring application.

FIG. 8 shows an illustrative diagram in which the packet monitoring application 220 assigns 805 correlation identifiers (IDs) 810 to each packet 115. The correlation IDs are unique to a particular data packet and follow that data packet throughout each component 405 (FIG. 4) in the virtualized network stack 410. The correlation ID may be, for example, a 32-bit number on a 64-bit operating system or a 16-bit number on a 32-bit operating system. Deployment of the correlation IDs enables the packet monitoring application to display the data path of the data packet, which can be informative for detecting packet latency, packet drops, etc. The user can therefore utilize parameters to filter which packets to track or disregard and then review each individual packet or group of like packets traversing through the virtualized network stack.

Figure 9:
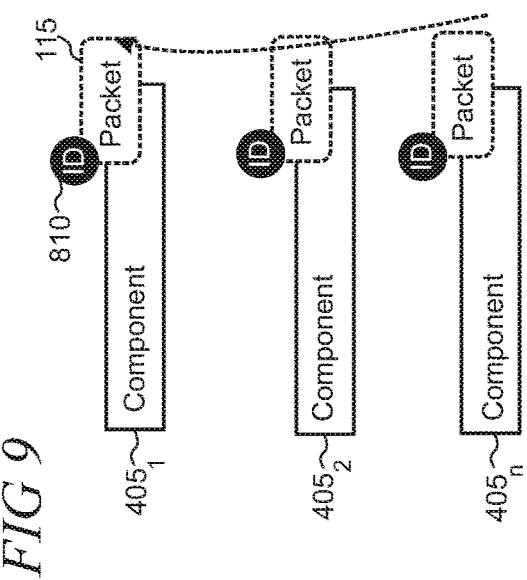
FIG. 9 shows an illustrative diagram in which a unique correlation ID follows the packet at each component within the virtualized network stack.

FIG. 9 shows an illustrative diagram in which the correlation ID 810 follows the packet 115 through each component 405 that the packet traverses. Each component may be a different network component in the virtualized network stack (e.g., a vSwitch, filter, virtual port, etc.). The packet monitoring application 220 (FIG. 2) is configured to display to the user each component in which a single data packet traverses using its assigned correlation ID. The correlation ID is preserved for each packet through packet transformations, such as packet encapsulations, network address translations, etc. The correlation ID is associated with the original packet and therefore any transformations to the packet are identifiable so that the original packet can still be identified. That is, for example, an outside header on an inner packet is recognizable so that the inner packet can still be tracked throughout the virtualized network stack.

Figure 10:
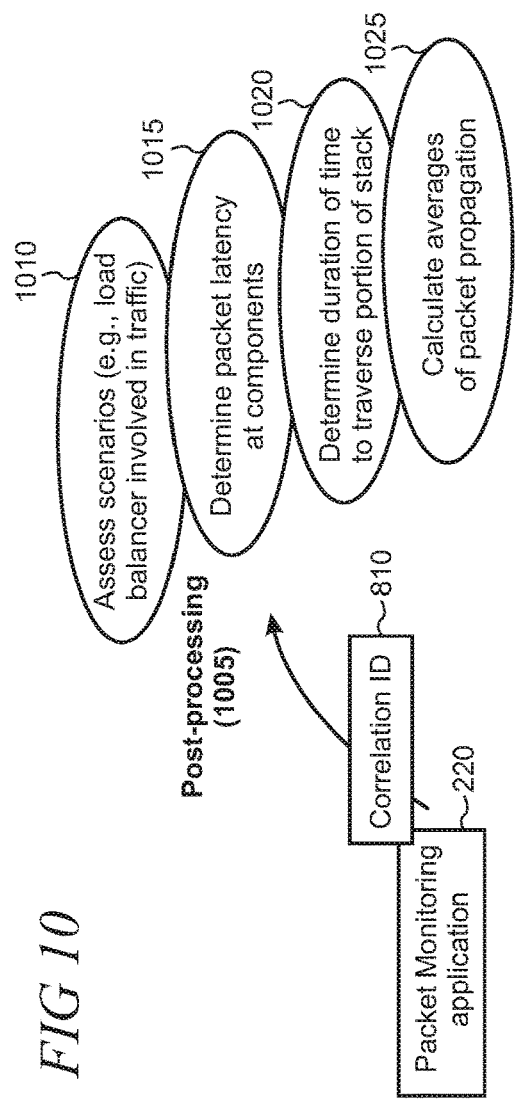
FIG. 10 shows an illustrative diagram in which the packet monitoring application utilizes the correlation IDs to determine packet latency at components.

FIG. 10 shows an illustrative diagram in which the packet monitoring application 220 can leverage the correlation IDs 810 associated with respective data packets 115 to perform post-processing 1005 on the filtered data packets. Post-processing tasks can include the packet monitoring application assessing scenarios in which customer issues are occurring 1010, determine packet latency at components 1015, determine a duration of time a packet takes to traverse a portion of the network stack 1020, and calculate averages of packet propagations across a defined portion or whole of the network stack 1025.

Regarding the assessment of scenarios, the packet monitoring application may trigger certain points within the virtualized network stack across one or multiple computer servers through which packets traverse. For example, in the scenario in which load balancing is performed for a customer-related issue, the packet monitoring application may be enabled on the computer server that performs the load balancing, a receiving server to which the packets are directed, and an originating server from which packets may have been transmitted to the customer's computing device. If data is not being load balanced, then the packet monitoring application may be enabled on the computer server being used. The correlation IDs can be used across computer servers to enable consistent review of a data packet throughout its traversal path. Other scenarios are also possible. Scenarios may be implemented through user input at a user interface associated with the computer server, or alternatively may be an automated process.

The components may report a timestamp for each data packet to the packet monitoring application. The timestamp may be associated with the boundaries (e.g., entrance and exit points) of components or within respective components (e.g., for packet drops). The capability to track packets traversing through the components enables the packet monitoring application to utilize the associated timestamp to perform at least some of the post-processing 1005 operations. For example, subtracting a timestamp's value when the packet was in one component from another timestamp value in a subsequent component can provide the latency for that data packet, at least with respect to those components. This information can also be utilized to calculate traversal averages, among other calculations.

The ability to track packets with a customizable level of granularity through each component of the virtualized network stack enables a user to quickly identify a root cause of a latency issue experienced by users. This can save network bandwidth by addressing packet drops and latency issues which may otherwise be stalling packet propagation. Automated processing which can identify increased latency relative to expected latency at components or a collection of components can further expedite the root cause determination to enable users to identify and address the problem. Greater networking speeds can ultimately be realized on the computer server, virtual machines and containers operating on the computer server, and customer devices utilizing the services provided by the computer server and the datacenter.

Figure 11:
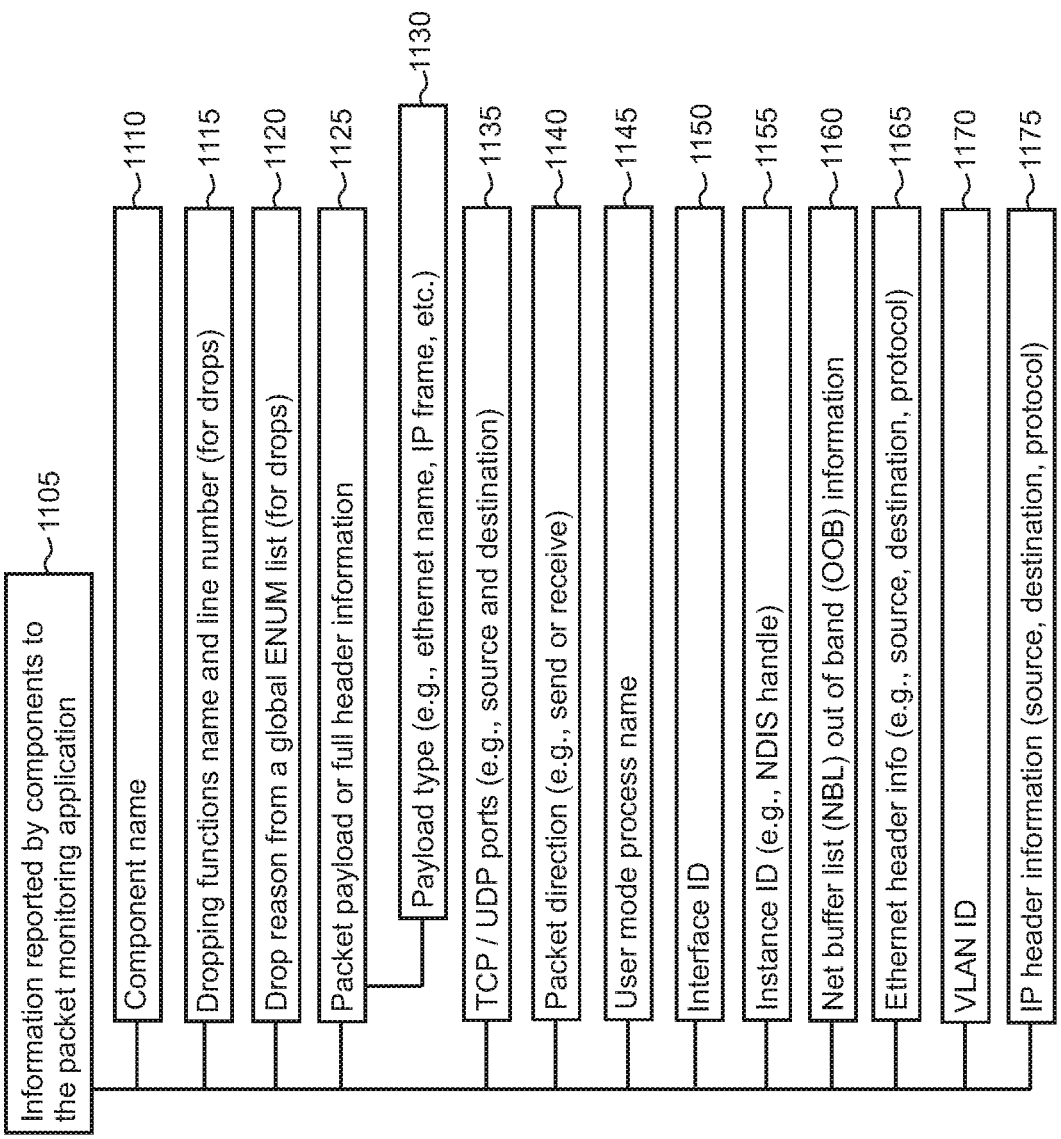
FIG. 11 shows an illustrative taxonomy of information reported by components to the packet monitoring application.

FIG. 11 shows a taxonomy of information reported by components 1105 for data packets 115 to the packet monitoring application 220. The reported information can include a component name 1110, dropping functions name and line number (for drops) 1115, drop reason from a global ENUM (enumeration) list (for drops) 1120, packet payload or header information 1125 including a payload type (e.g., ethernet name, IP frame, etc.) 1130, TCP/UDP ports (e.g., source and/or destination) 1135, packet direction (e.g., send or receive) 1140, user mode process name 1145, interface ID 1150, instance ID (e.g., NDIS handle) 1155, net buffer list (NBL) out of band (OOB) information 1160, ethernet header information (e.g., source, destination, protocol) 1165, VLAN ID 1170, and IP header information (e.g., source, destination, protocol) 1175.

Figure 12:
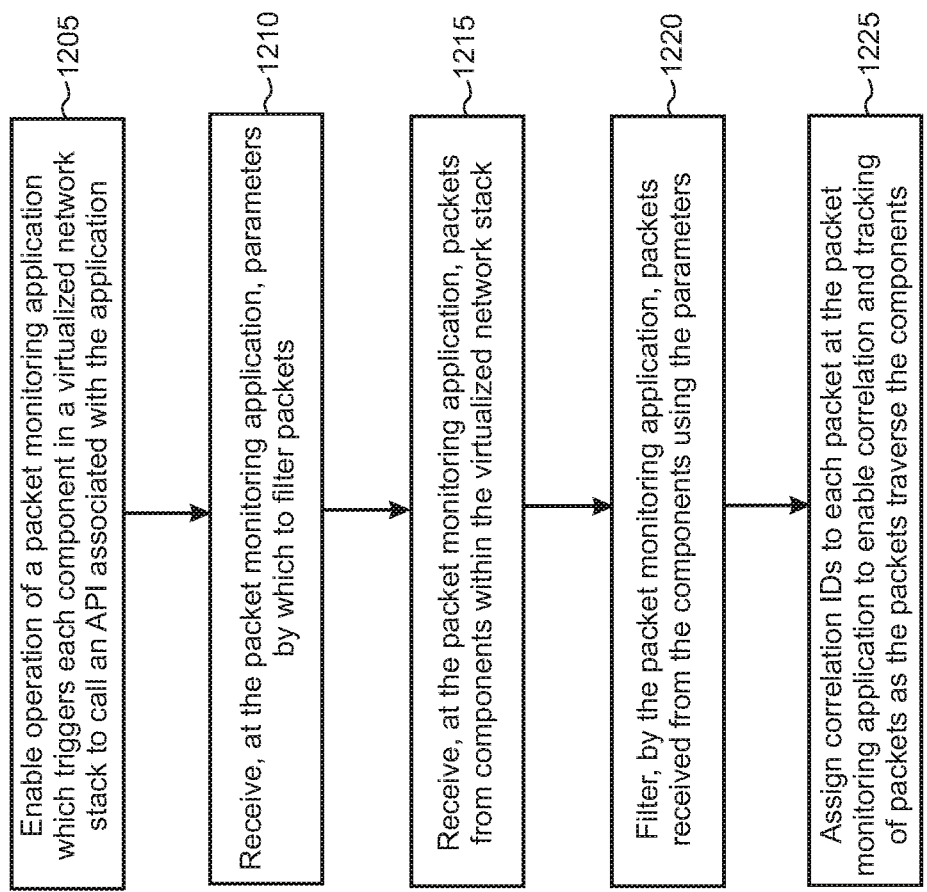
FIGS. 12-14 are flowcharts of illustrative methods performed by one or more computer servers within a datacenter.
Figure 13:
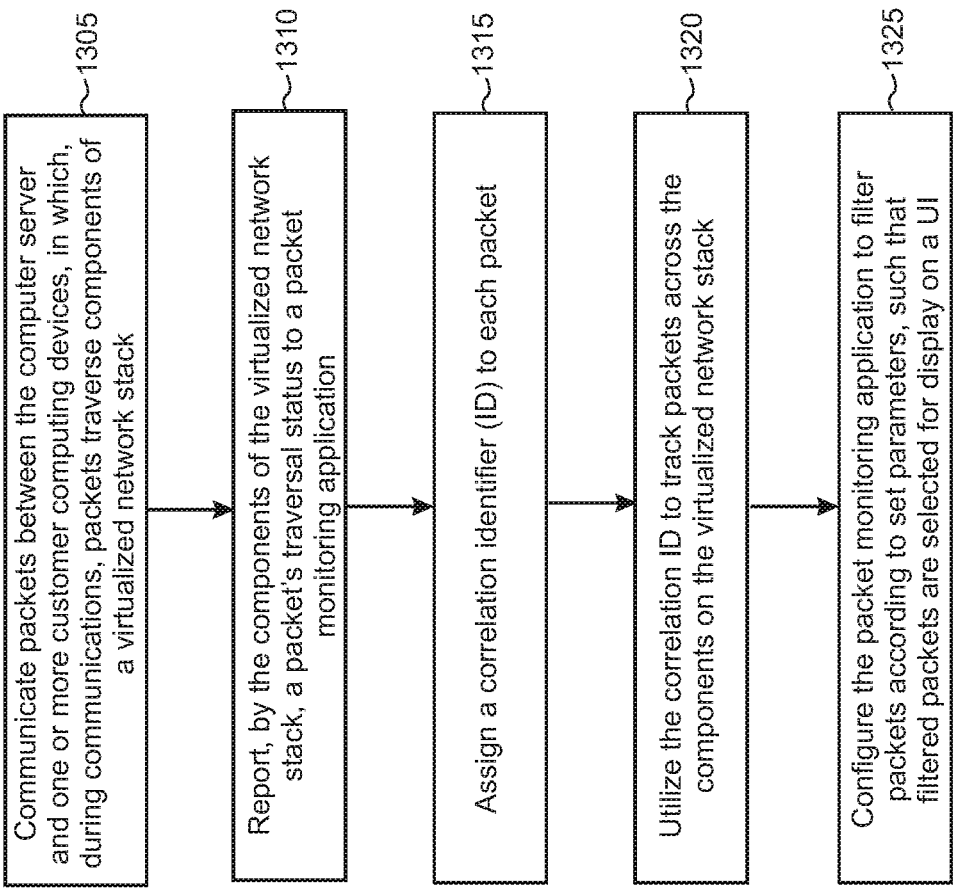
Figure 14:
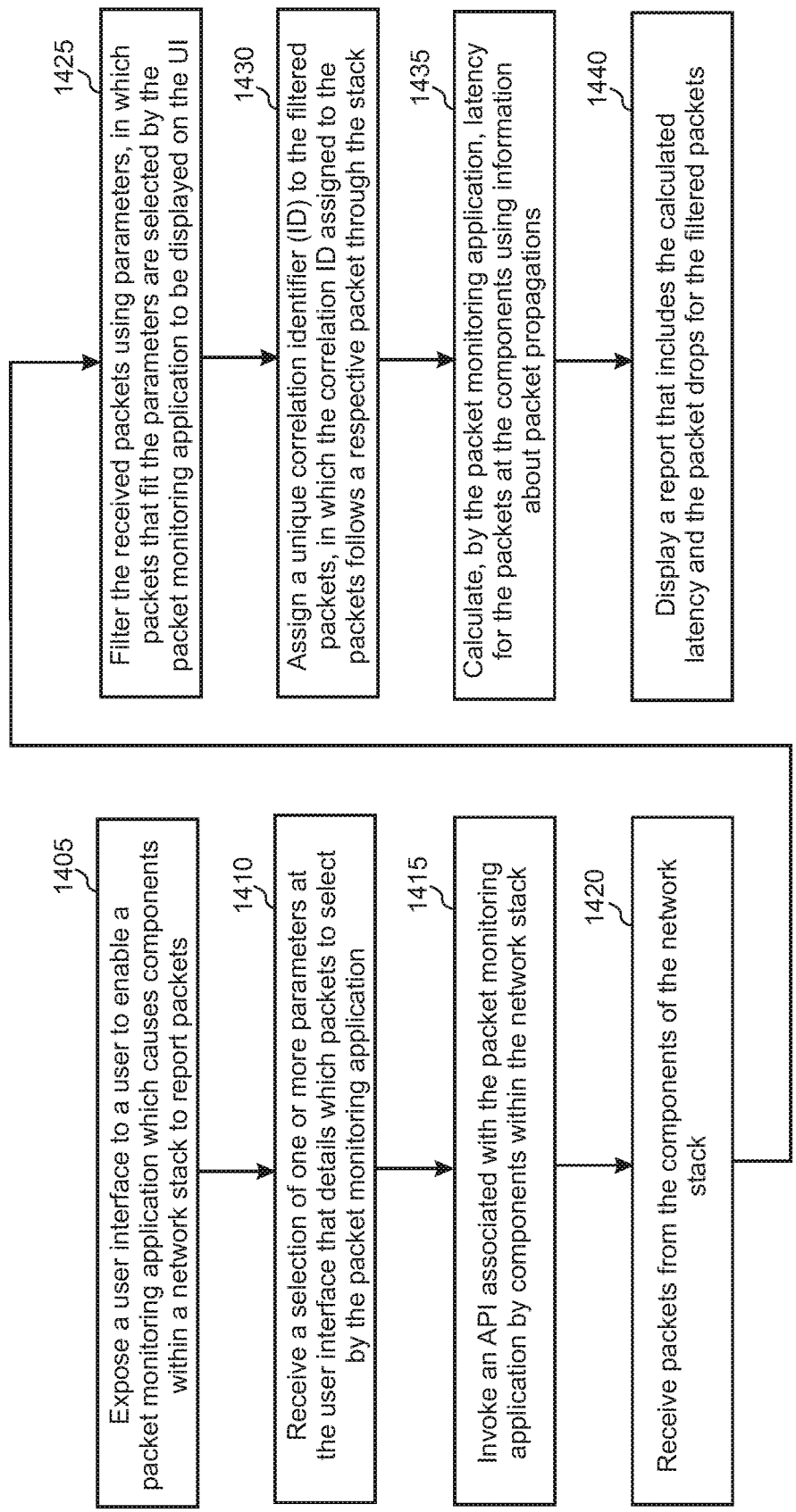

FIGS. 12-14 are flowcharts of illustrative methods 1200, 1300, and 1400, that may be performed using the computer server 110 or the computing device 120. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1205, in FIG. 12, the computer server enables operation of a packet monitoring application which triggers each component in a virtualized network stack to call an API associated with the packet monitoring application. In step 1210, the computer server receives, at the packet monitoring application, parameters by which to filter packets. In step 1215, the computer server receives, at the packet monitoring application, packets from components within the virtualized network stack. In step 1220, the computer server filters, by the packet monitoring application, packets received from the components using the parameters. In step 1225, the computer server assigns, at the packet monitoring application, correlation IDs to each packet to enable correlation and tracking of packets as the packets traverse components of the virtualized network stack.

In step 1305, in FIG. 13, the computer server communicates packets with one or more customer computing devices, in which, during communications, packets traverse through components of a virtualized network stack on the computer server. In step 1310, the components of the virtualized network stack report a packet's traversal status to a packet monitoring application. In step 1315, the computer server assigns a correlation ID to each packet. In step 1320, the computer server utilizes the correlation ID to track packets across the components on the virtualized network stack. In step 1325, the computer server configures the packet monitoring application to filter packets according to set parameters, such that respective packets are selected for display on the user interface associated with the computer server.

In step 1405, in FIG. 14, the computer server exposes a user interface to a user to enable a packet monitoring application which causes components within a network stack to report packets to a packet monitoring application. In step 1410, the computer server receives a selection of one or more parameters at the user interface that details which packets to select by the packet monitoring application. In step 1415, the components within the network stack invoke an API associated with the packet monitoring application. In step 1420, the packet monitoring application receives packets from the components of the network stack. In step 1425, the packet monitoring application filters the received packets using parameters, in which packets that fit the parameters are selected by the packet monitoring application to be displayed on the user interface. In step 1430, the packet monitoring application assigns a unique correlation ID to the filtered packets, in which the correlation ID assigned to the packets follows a respective packet through the network stack. In step 1435, the packet monitoring application calculates latency for the packets at the components using information about packet propagations. In step 1440, the computer server displays a report that includes the calculated latency and the packet drops for the filtered packets.

Figure 15:
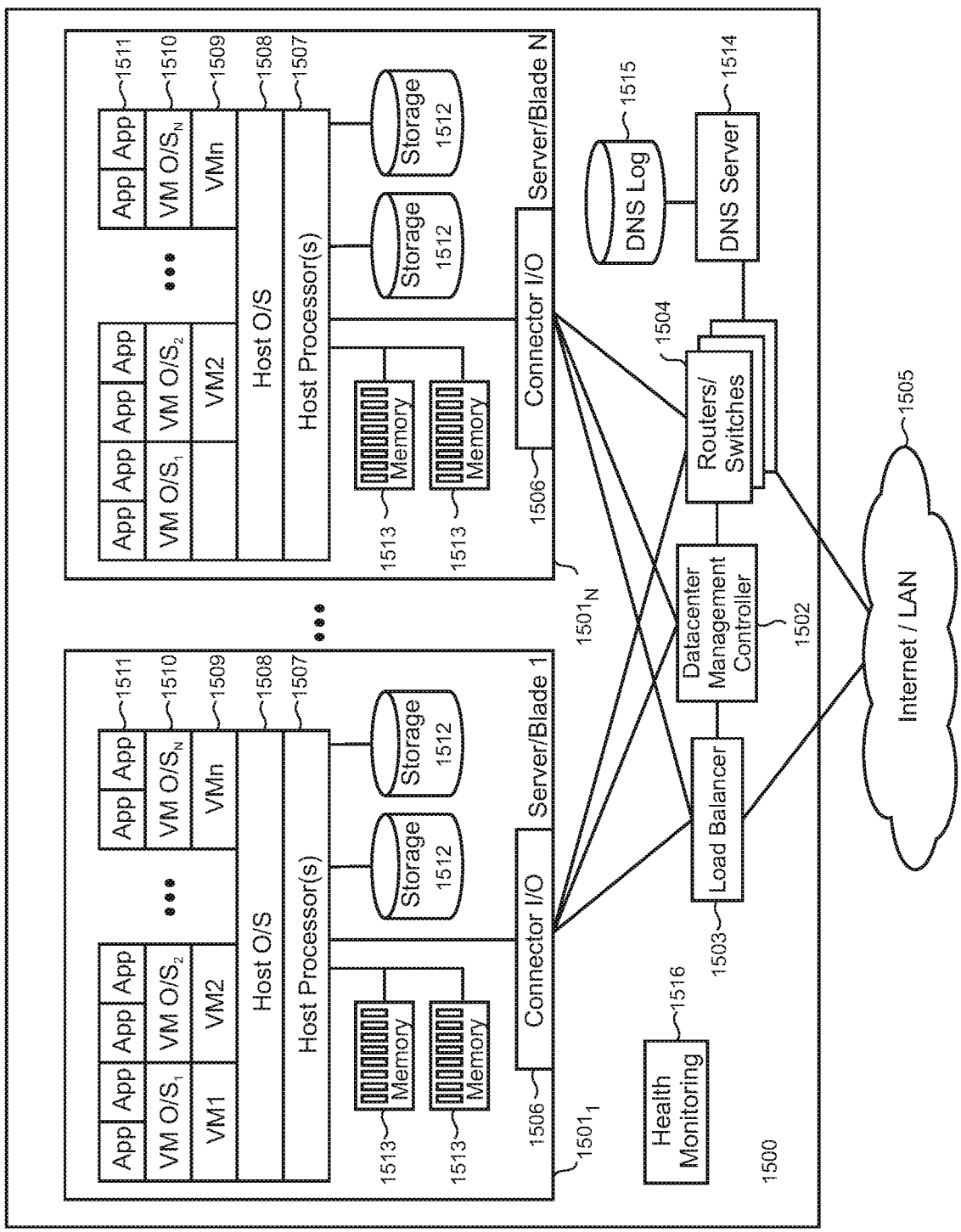
FIG. 15 is a block diagram of an illustrative datacenter that may be used at least in part to implement the present packet drop detection in local networking stack through packet correlation.

FIG. 15 is a high-level block diagram of an illustrative datacenter 1500 that provides cloud computing services or distributed computing services that may be used to implement the present packet drop detection in local networking stack through packet correlation. A plurality of servers 1501 are managed by datacenter management controller 1502. Load balancer 1503 distributes requests and computing workloads over servers 1501 to avoid a situation wherein a single server may become overwhelmed. Load balancer 1503 maximizes available capacity and performance of the resources in datacenter 1500. Routers/switches 1504 support data traffic between servers 1501 and between datacenter 1500 and external resources and users (not shown) via an external network 1505, which may be, for example, a local area network (LAN) or the Internet.

Servers 1501 may be standalone computing devices, and/or they may be configured as individual blades in a rack of one or more server devices. Servers 1501 have an input/output (I/O) connector 1506 that manages communication with other database entities. One or more host processors 1507 on each server 1501 run a host operating system (O/S) 1508 that supports multiple virtual machines (VM) 1509. Each VM 1509 may run its own O/S so that each VM O/S 1510 on a server is different, or the same, or a mix of both. The VM O/S's 1510 may be, for example, different versions of the same O/S (e.g., different VMs running different current and legacy versions of the Windows® operating system). In addition, or alternatively, the VM O/S's 1510 may be provided by different manufacturers (e.g., some VMs running the Windows® operating system, while other VMs are running the Linux® operating system). Each VM 1509 may also run one or more applications (Apps) 1511. Each server 1501 also includes storage 1512 (e.g., hard disk drives (HDD)) and memory 1513 (e.g., RAM) that can be accessed and used by the host processors 1507 and VMs 1509 for storing software code, data, etc. In one embodiment, a VM 1509 may employ the data plane APIs as disclosed herein.

Datacenter 1500 provides pooled resources on which customers can dynamically provision and scale applications as needed without having to add servers or additional networking. This allows customers to obtain the computing resources they need without having to procure, provision, and manage infrastructure on a per-application, ad-hoc basis. A cloud computing datacenter 1500 allows customers to scale up or scale down resources dynamically to meet the current needs of their business. Additionally, a datacenter operator can provide usage-based services to customers so that they pay for only the resources they use, when they need to use them. For example, a customer may initially use one VM 1509 on server $1501_1$ to run their applications 1511. When demand for an application 1511 increases, the datacenter 1500 may activate additional VMs 1509 on the same server $1501_1$ and/or on a new server $1501_N$ as needed. These additional VMs 1509 can be deactivated if demand for the application later drops.

Datacenter 1500 may offer guaranteed availability, disaster recovery, and back-up services. For example, the datacenter may designate one VM 1509 on server $1501_1$ as the primary location for the customer's applications and may activate a second VM 1509 on the same or different server as a standby or back-up in case the first VM or server $1501_1$ fails. Datacenter management controller 1502 automatically shifts incoming user requests from the primary VM to the back-up VM without requiring customer intervention. Although datacenter 1500 is illustrated as a single location, it will be understood that servers 1501 may be distributed to multiple locations across the globe to provide additional redundancy and disaster recovery capabilities. Additionally, datacenter 1500 may be an on-premises, private system that provides services to a single enterprise user or may be a publicly accessible, distributed system that provides services to multiple, unrelated customers or may be a combination of both.

Domain Name System (DNS) server 1514 resolves domain and host names into IP (Internet Protocol) addresses for all roles, applications, and services in datacenter 1500. DNS log 1515 maintains a record of which domain names have been resolved by role. It will be understood that DNS is used herein as an example and that other name resolution services and domain name logging services may be used to identify dependencies.

Datacenter health monitoring 1516 monitors the health of the physical systems, software, and environment in datacenter 1500. Health monitoring 1516 provides feedback to datacenter managers when problems are detected with servers, blades, processors, or applications in datacenter 1500 or when network bandwidth or communications issues arise.

Figure 16:
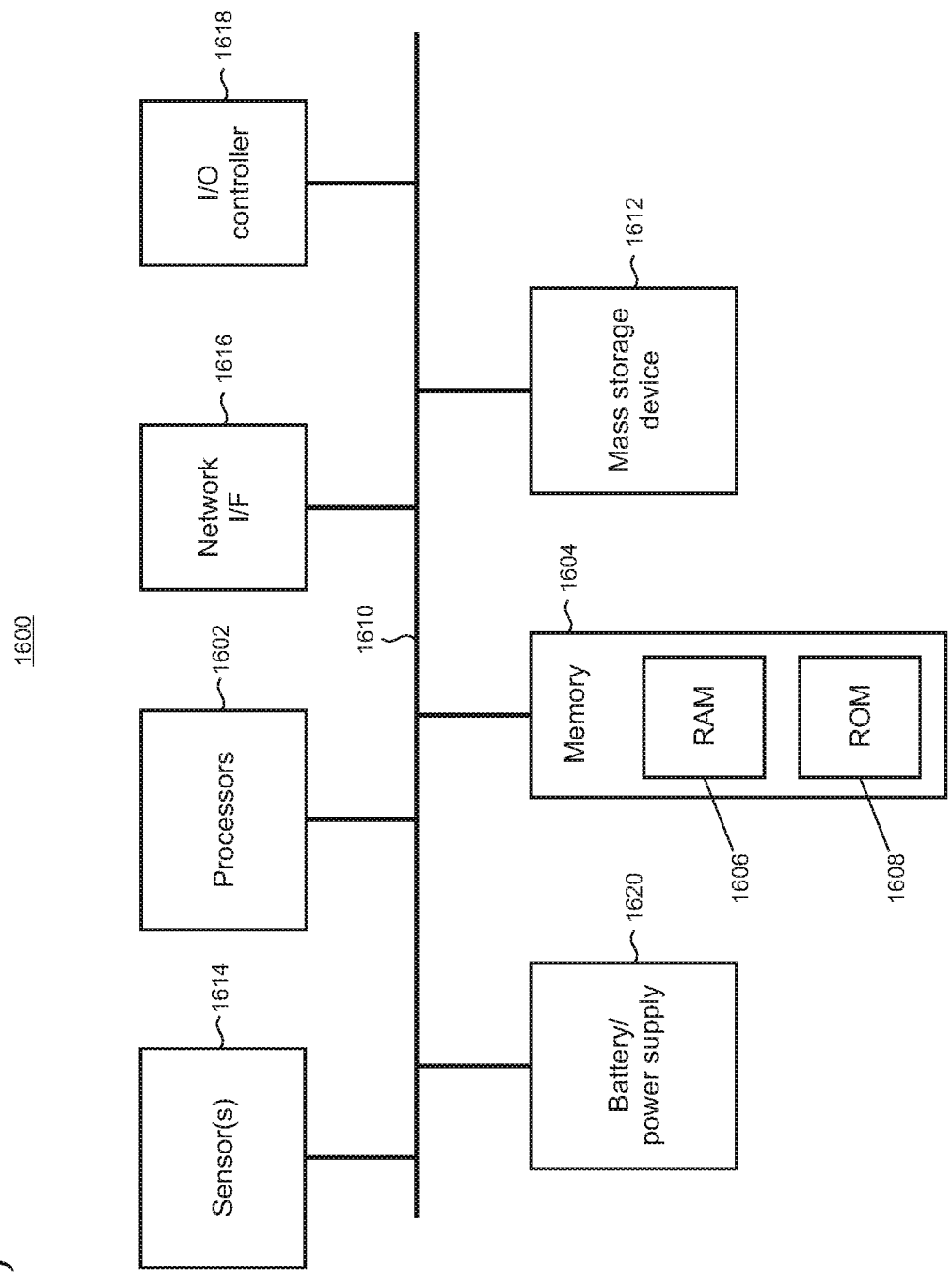
FIG. 16 is a simplified block diagram of an illustrative architecture of a computing device that may be used at least in part to implement the present packet drop detection in local networking stack through packet correlation.

FIG. 16 shows an illustrative architecture 1600 for a client computing device such as a laptop computer or personal computer for the present packet drop detection in local networking stack through packet correlation. The architecture 1600 illustrated in FIG. 16 includes one or more processors 1602 (e.g., central processing unit, dedicated Artificial Intelligence chip, graphics processing unit, etc.), a system memory 1604, including RAM (random access memory) 1606 and ROM (read only memory) 1608, and a system bus 1610 that operatively and functionally couples the components in the architecture 1600. A basic input/output system containing the basic routines that help to transfer information between elements within the architecture 1600, such as during startup, is typically stored in the ROM 1608. The architecture 1600 further includes a mass storage device 1612 for storing software code or other computer-executed code that is utilized to implement applications, the file system, and the operating system. The mass storage device 1612 is connected to the processor 1602 through a mass storage controller (not shown) connected to the bus 1610. The mass storage device 1612 and its associated computer-readable storage media provide non-volatile storage for the architecture 1600. Although the description of computer-readable storage media contained herein refers to a mass storage device, such as a hard disk or CD-ROM drive, it may be appreciated by those skilled in the art that computer-readable storage media can be any available storage media that can be accessed by the architecture 1600.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray, or other optical storage, magnetic cassette, magnetic tape, magnetic disk storage or other magnetic storage device, or any other medium which can be used to store the desired information and which can be accessed by the architecture 1600.

According to various embodiments, the architecture 1600 may operate in a networked environment using logical connections to remote computers through a network. The architecture 1600 may connect to the network through a network interface unit 1616 connected to the bus 1610. It may be appreciated that the network interface unit 1616 also may be utilized to connect to other types of networks and remote computer systems. The architecture 1600 also may include an input/output controller 1618 for receiving and processing input from a number of other devices, including a keyboard, mouse, touchpad, touchscreen, control devices such as buttons and switches or electronic stylus (not shown in FIG. 16). Similarly, the input/output controller 1618 may provide output to a display screen, user interface, a printer, or other type of output device (also not shown in FIG. 16).

It may be appreciated that the software components described herein may, when loaded into the processor 1602 and executed, transform the processor 1602 and the overall architecture 1600 from a general-purpose computing system into a special-purpose computing system customized to facilitate the functionality presented herein. The processor 1602 may be constructed from any number of transistors or other discrete circuit elements, which may individually or collectively assume any number of states. More specifically, the processor 1602 may operate as a finite-state machine, in response to executable instructions contained within the software modules disclosed herein. These computer-executable instructions may transform the processor 1602 by specifying how the processor 1602 transitions between states, thereby transforming the transistors or other discrete hardware elements constituting the processor 1602.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1600 may further include one or more sensors 1614 or a battery or power supply 1620. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1600 in order to store and execute the software components presented herein. It also may be appreciated that the architecture 1600 may include other types of computing devices, including wearable devices, handheld computers, embedded computer systems, smartphones, PDAs, and other types of computing devices known to those skilled in the art. It is also contemplated that the architecture 1600 may not include all of the components shown in FIG. 16, may include other components that are not explicitly shown in FIG. 16, or may utilize an architecture completely different from that shown in FIG. 16.

Figure 17:
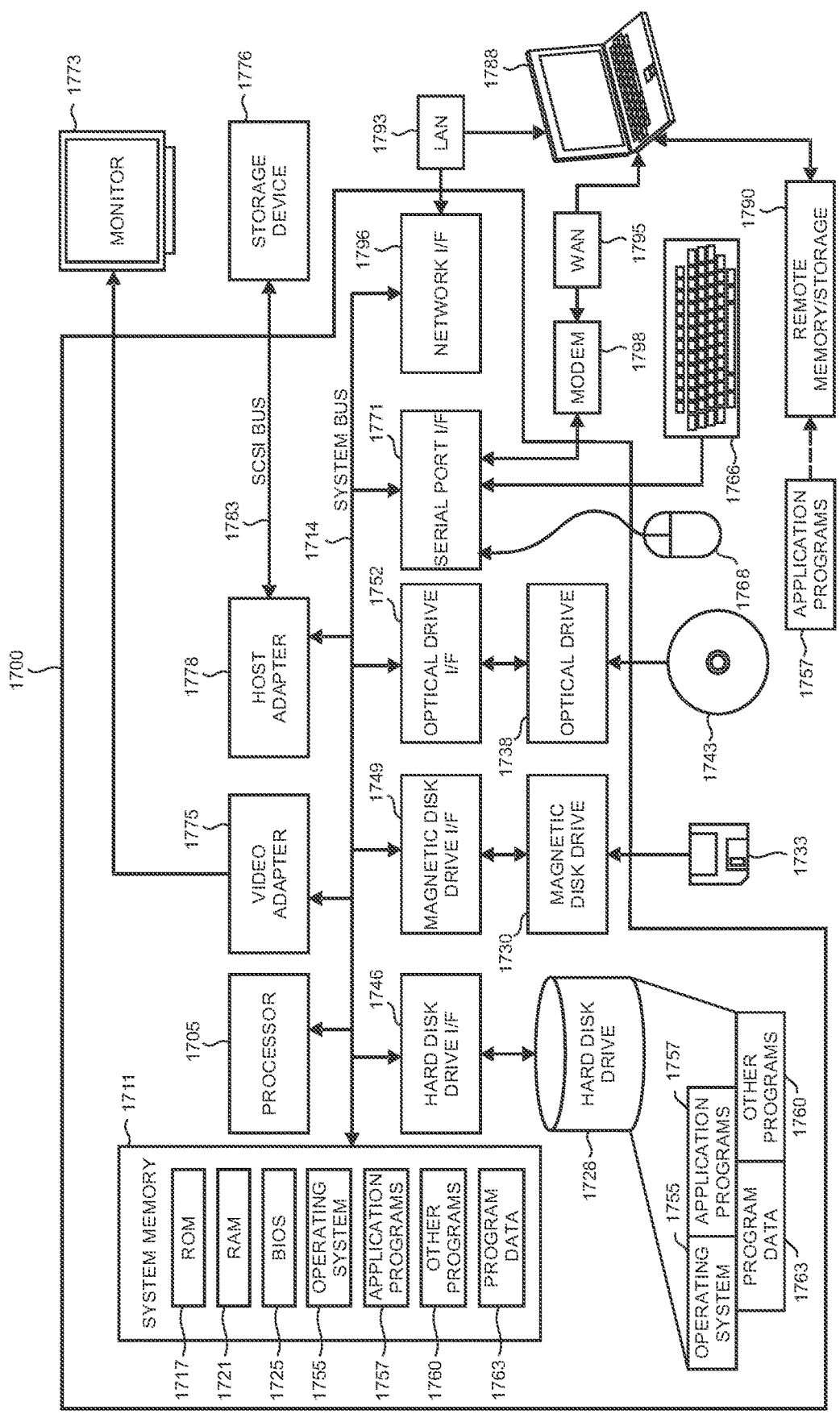
FIG. 17 is a simplified block diagram of an illustrative remote computing device, remote service, or computer system that may be used in part to implement the present packet drop detection in local networking stack through packet correlation.

FIG. 17 is a simplified block diagram of an illustrative computer system 1700 such as a PC or server with which the present packet drop detection in local networking stack through packet correlation may be implemented. Computer system 1700 includes a processor 1705, a system memory 1711, and a system bus 1714 that couples various system components including the system memory 1711 to the processor 1705. The system bus 1714 may be any of several types of bus structures including a memory bus or memory controller, a peripheral bus, or a local bus using any of a variety of bus architectures. The system memory 1711 includes read only memory (ROM) 1717 and random-access memory (RAM) 1721. A basic input/output system (BIOS) 1725, containing the basic routines that help to transfer information between elements within the computer system 1700, such as during startup, is stored in ROM 1717. The computer system 1700 may further include a hard disk drive 1728 for reading from and writing to an internally disposed hard disk (not shown), a magnetic disk drive 1730 for reading from or writing to a removable magnetic disk 1733 (e.g., a floppy disk), and an optical disk drive 1738 for reading from or writing to a removable optical disk 1743 such as a CD (compact disc), DVD (digital versatile disc), or other optical media. The hard disk drive 1728, magnetic disk drive 1730, and optical disk drive 1738 are connected to the system bus 1714 by a hard disk drive interface 1746, a magnetic disk drive interface 1749, and an optical drive interface 1752, respectively. The drives and their associated computer-readable storage media provide non-volatile storage of computer-readable instructions, data structures, program modules, and other data for the computer system 1700. Although this illustrative example includes a hard disk, a removable magnetic disk 1733, and a removable optical disk 1743, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present packet drop detection in local networking stack through packet correlation. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1733, optical disk 1743, ROM 1717, or RAM 1721, including an operating system 1755, one or more application programs 1757, other program modules 1760, and program data 1763. A user may enter commands and information into the computer system 1700 through input devices such as a keyboard 1766 and pointing device 1768 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1705 through a serial port interface 1771 that is coupled to the system bus 1714, but may be connected by other interfaces, such as a parallel port, game port, or universal serial bus (USB). A monitor 1773 or other type of display device is also connected to the system bus 1714 via an interface, such as a video adapter 1775. In addition to the monitor 1773, personal computers typically include other peripheral output devices (not shown), such as speakers and printers. The illustrative example shown in FIG. 17 also includes a host adapter 1778, a Small Computer System Interface (SCSI) bus 1783, and an external storage device 1776 connected to the SCSI bus 1783.

The computer system 1700 is operable in a networked environment using logical connections to one or more remote computers, such as a remote computer 1788. The remote computer 1788 may be selected as another personal computer, a server, a router, a network PC, a peer device, or other common network node, and typically includes many or all of the elements described above relative to the computer system 1700, although only a single representative remote memory/storage device 1790 is shown in FIG. 17. The logical connections depicted in FIG. 17 include a local area network (LAN) 1793 and a wide area network (WAN) 1795. Such networking environments are often deployed, for example, in offices, enterprise-wide computer networks, intranets, and the Internet.

When used in a LAN networking environment, the computer system 1700 is connected to the local area network 1793 through a network interface or adapter 1796. When used in a WAN networking environment, the computer system 1700 typically includes a broadband modem 1798, network gateway, or other means for establishing communications over the wide area network 1795, such as the Internet. The broadband modem 1798, which may be internal or external, is connected to the system bus 1714 via a serial port interface 1771. In a networked environment, program modules related to the computer system 1700, or portions thereof, may be stored in the remote memory storage device 1790. It is noted that the network connections shown in FIG. 17 are illustrative and other means of establishing a communications link between the computers may be used depending on the specific requirements of an application of the present packet drop detection in local networking stack through packet correlation.

Various exemplary embodiments of the present packet drop detection in local networking stack through packet correlation are now presented by way of illustration and not as an exhaustive list of all embodiments. An example includes a method performed by a computer server to monitor packet propagations and drops through a virtualized network stack hosted on the computer server, comprising: enabling operation of a packet monitoring application which triggers each component in a virtualized network stack to call an application programming interface (API) associated with the packet monitoring application; receiving, at the packet monitoring application, parameters by which to filter packets; receiving, at the packet monitoring application, packets from components within the virtualized network stack, in which the components are networking components configured to process and route packets traversing through the virtualized network stack; filtering, by the packet monitoring application, packets received from the components using the parameters, in which packets that meet the parameters are selected for display on a user interface associated with the computer server; and assigning correlation IDs (identifiers) to each packet at the packet monitoring application to enable correlation and tracking of packets as the packets traverse the components of the virtualized network stack.

In another example, the virtualized network stack includes a combination of hardware networking devices and software defined networking (SDN) components. In another example, the SDN components include a virtual switch, a virtual machine network interface controller (vNIC), a network driver interface specification (NDIS), and filters or extensions associated with the NDIS. In another example, the method further comprises displaying a report of the filtered packets on the user interface. In another example, the method further comprises encapsulating packets with an outer header and applying the filtration parameters to an inner header and the outer header of the encapsulated packets. In another example, the method further comprises determining latency for packets at each component of the virtualized network stack using the assigned correlation IDs. In another example, the components report packet drops that occur at any point within the respective component to the packet monitoring application, and the components report successful packet propagations based on a respective packet meeting a boundary of the component. In another example, the parameters include filtering packets by internet protocol (IP) address source. In another example, the parameters include filtering packets by internet protocol (IP) address destination. In another example, the parameters include filtering packets by MAC (media access control) address for a source or destination. In another example, the parameters include filtering packets by an ethernet protocol. In another example, the parameters include filtering packets at individual components of a plurality of available components within the virtualized network stack. In another example, the parameters include filtering packets by a port source or port destination. In another example, the parameters include filtering packets by TCP (Transmission Control Protocol) flags, including any one or more of TCP SYN (synchronize), TCP RST (reset), or TCP FIN (finish).

A further example includes a computer server configured with a packet monitoring application to track packets across a virtualized network stack on the computer server, comprising one or more processors and one or more hardware-based non-transitory memory devices storing computer-readable instructions which, when executed by the one or more processors, cause the computer server to: communicate packets between the computer server and one or more customer computing devices, in which, during communications, the packets traverse through components of the virtualized network stack, the components being virtual network components or physical network components associated with the virtualized network stack; report, by the components of the virtualized network stack, a packet's traversal status to a packet monitoring application; assign a correlation identifier (ID) to each packet; utilize the correlation ID to track packets across the components on the virtualized network stack; and configure the packet monitoring application to filter packets according to set parameters, such that respective packets are selected for display on a user interface responsive to the packets meeting one or more of the parameters.

In another example, the filtration parameters are set responsive to user input. In another example, the computer server further includes multiple computer servers having respective packet monitoring applications for tracking packets, in which packets are tracked on virtualized network stacks across each computer server on which the packets traverse. In another example, the executed instructions further cause the computer server to display on the user interface associated with the computer server an option to enable and disable the packet monitoring application, wherein the components report the status of packets responsive to the user interface receiving input enabling the packet monitoring application, and wherein a default setting of the packet monitoring application is disabled.

A further example includes one or more hardware-based non-transitory computer-readable memory devices storing instructions which, when executed by one or more processors disposed in a computer server, cause the computer server to: expose a user interface to a user to enable a packet monitoring application which causes components within a network stack to report packets; receive a selection of one or more parameters at the user interface that details which packets to select by the packet monitoring application; invoke an application programming interface (API) associated with the packet monitoring application by components within the network stack, in which the components use the API to report packet drops and packet propagations to the packet monitoring application; receive packets from the components of the network stack; filter the received packets using parameters, in which packets that fit the parameters are selected by the packet monitoring application to be displayed on the user interface associated with the computer server; assign a unique correlation identifier (ID) to the filtered packets, in which the correlation ID assigned to the packets follows a respective packet through the network stack; calculate, by the packet monitoring application, latency for the packets at the components using information about packet propagations from the components and correlation IDs assigned to respective packets; and display a report that includes the calculated latency and the packet drops for the filtered packets.

In another example, the executed instructions further cause the computer server to register components within the network stack with the packet monitoring application, wherein only registered components are capable of invoking the API associated with the packet monitoring application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a computer server to monitor packet propagations and drops through a virtualized network stack hosted on the computer server, comprising:
    enabling operation of a packet monitoring application which triggers each component in a virtualized network stack to call an application programming interface (API) associated with the packet monitoring application, in which the virtualized network stack includes components comprising a virtual switch, a physical network interface controller (NIC), one or more virtual NICs, at least one network driver interface to one or more of the NICs, and an application socket API;
    receiving, at the packet monitoring application, parameters by which to filter packets at each of the components in the virtualized network stack, wherein the computer server exposes a user interface through which the filtering parameters are selectable by a user;
    receiving, at the packet monitoring application, packets from the components within in the virtualized network stack, in which the components are configured to process and route packets traversing through the virtualized network stack from the physical NIC to the application socket API, wherein the packets comprise customer data traffic;
    filtering, by the packet monitoring application, packets received from the components using the filtering parameters, in which the filtering is performed at each component calling the API associated with the packet monitoring application during the packet traversal through the virtualized network stack, and in which packets that meet the filtering parameters are selected for display on a user interface associated with the computer server;
    encapsulating packets with an outer header;
    applying the filtering parameters to an inner header and the outer header of the encapsulated packets; and
    assigning correlation identifiers (IDs) to each packet at the packet monitoring application at entry at the physical NIC to enable correlation and tracking of packets as the packets traverse the components of the virtualized network stack from the physical NIC to the application socket API.

2. The method of claim 1, in which the virtualized network stack includes a combination of hardware networking devices and software defined networking (SDN) components.

3. The method of claim 2, in which the SDN components include a virtual switch, a virtual machine network interface controller (vNIC), a network driver interface specification (NDIS), and filters or extensions associated with the NDIS.

4. The method of claim 1, further comprising displaying a report of the filtered packets on the user interface.

5. The method of claim 1, further comprising determining latency for packets at each component of the virtualized network stack using the assigned correlation IDs.

6. The method of claim 1, in which:
the components report packet drops that occur at any point within the respective component to the packet monitoring application, and
the components report successful packet propagations based on a respective packet meeting a boundary of the component.

7. The method of claim 1, in which the parameters include filtering packets by internet protocol (IP) address source.

8. The method of claim 1, in which the parameters include filtering packets by internet protocol (IP) address destination.

9. The method of claim 1, in which the parameters include filtering packets by MAC (media access control) address for a source or destination.

10. The method of claim 1, in which the parameters include filtering packets by an Ethernet protocol.

11. The method of claim 1, in which the parameters include filtering packets at individual components of a plurality of available components within the virtualized network stack.

12. The method of claim 1, in which the parameters include filtering packets by a port source or port destination.

13. The method of claim 1, in which the parameters include filtering packets by TCP (Transmission Control Protocol) flags, including any one or more of TCP SYN (synchronize), TCP RST (reset), or TCP FIN (finish).

14. A computer server configured with a packet monitoring, application to track packets across a virtualized network stack on the computer server, comprising:
one or more processors;
a user interface configured to enable a user to select filtering parameters for the packets traversing the virtualized network stack; and
one or more hardware-based non-transitory memory devices storing computer-readable instructions which, when executed by the one or more processors, cause the computer server to:
communicate packets between the computer server and one or more customer computing devices, in which, during communications, the packets traverse through components of the virtualized network stack, in which the components comprise a virtual switch, a physical network interface controller (NIC), one or more virtual NICs, at least one network driver interface to one or more of the NICs, and an application socket application programming interface (API), wherein the packets comprise customer data traffic;
report, by the components of the virtualized network stack, a packet's traversal status to a packet monitoring application;
assign a correlation identifier (ID) to each packet at entry to the physical NIC;
configure the packet monitoring application to filter packets according to selected filtering parameters in which the filtering is performed at each component calling an API associated with the packet monitoring application during the packet traversal through the virtualized network stack, and in which respective packets are selected for display on the user interface responsive to the packets meeting one or more of the selected filtering parameters;
encapsulating packets with an outer header;
applying the filtering parameters to an inner header and the outer header of the encapsulated packets; and
utilize the correlation ID to track filtered packets across components of the virtualized network stack from the physical NIC to the application socket API.

15. The computer server of claim 14, in which the filtering parameters are set responsive to user input from the user to the user interface.

16. The computer server of claim 14, further including multiple computer servers having respective packet monitoring applications for tracking packets, in which packets are tracked on virtualized network stacks across each computer server on which the packets traverse.

17. The computer server of claim 14, in which the executed instructions further cause the computer server to:
display on the user interface associated with the computer server an option to enable and disable the packet monitoring application,
wherein the components report the status of packets responsive to the user interface receiving input enabling the packet monitoring application, and
wherein a default setting of the packet monitoring application is disabled.

18. One or more hardware-based non-transitory computer-readable memory devices storing instructions which, when executed by one or more processors disposed in a computer server, cause the computer server to:
expose a user interface to a user to enable a packet monitoring application which causes components within a virtualized network stack to report status of packets traversing the virtualized network stack, in which the virtualized network stack includes components comprising a virtual switch, a physical network interface controller (NIC), one or more virtual NICs, at least one network driver interface to one or more of the NICs, and an application socket application programming interface (API);
configure the user interface to enable a selection of one or more filtering parameters by a user;
invoke a packet monitoring API by the components within the virtualized network stack, in which the components use the packet monitoring API to report packet drops and packet propagations to the packet monitoring application;
receive packets from the components of the virtualized network stack, wherein the received packets comprise customer data traffic;
filter the received packets using selected filtering parameters at each of the components in the virtualized network stack, in which the filtering is performed at each component calling the packet monitoring API during the packets traversal through the virtualized network stack, and in which packets that fit the filtering parameters are displayed by the packet monitoring application on the user interface;
encapsulating packets with an outer header;
applying the filtering parameters to an inner header and the outer header of the encapsulated packets;
assign a unique correlation identifier (ID) to the filtered packets at entry at the physical NIC, in which the correlation ID assigned to the packets follows a respective packet through the virtualized network stack from the physical NIC to the application socket API;
calculate, by the packet monitoring application, latency for the packets at the components using information about packet propagations from the components and correlation IDs assigned to respective packets; and display a report on the user interface that includes the calculated latency and the packet drops for the filtered packets.

19. The one or more hardware-based non-transitory computer-readable memory devices of claim 18, in which the executed instructions further cause the computer server to register components within the virtualized network stack with the packet monitoring application, wherein only registered components are capable of invoking the API associated with the packet monitoring application.

* * * * *